United States Patent [19]

Yamada

[11] Patent Number: 5,568,191
[45] Date of Patent: Oct. 22, 1996

[54] VIDEO CAMERA AND METHOD WITH CONTROLLED INTERFACE REGISTERS

[75] Inventor: Kunihiko Yamada, Tanishi, Japan

[73] Assignee: Canon Kabushiki Kaisha, Tokyo, Japan

[21] Appl. No.: 260,530

[22] Filed: Jun. 16, 1994

[30] Foreign Application Priority Data

Jun. 21, 1993 [JP] Japan .................................. 5-149462

[51] Int. Cl.$^6$ ............................... H04N 5/228; H04N 5/76
[52] U.S. Cl. ............................................ 348/222; 348/231
[58] Field of Search ...................................... 348/222, 720, 348/721, 231, 571, 714, 719; H04N 5/228, 5/76

[56] References Cited

U.S. PATENT DOCUMENTS

| 5,093,716 | 3/1992 | Kondo et al. | 358/41 |
| 5,101,277 | 3/1992 | Kanata | 358/227 |
| 5,200,813 | 4/1993 | Jeon | 348/223 |
| 5,287,171 | 2/1994 | Ohtsubo | 348/222 |

FOREIGN PATENT DOCUMENTS

| 0424111 | 10/1990 | European Pat. Off. . |
| 0501723 | 9/1992 | European Pat. Off. . |

OTHER PUBLICATIONS

N. Naji, "Serial techniques expand your options for µC peripherals," Electrical Design News 33 (1988) Feb. 18, No. 4, pp. 199–204.

Primary Examiner—John K. Peng
Assistant Examiner—Sherrie Hsia
Attorney, Agent, or Firm—Robin, Blecker, Daley & Driscoll

[57] ABSTRACT

A video camera is provided in which an effective image plane is not affected even if a command to write data is supplied from a microcomputer to a signal processing portion in an effective video period. A plurality of control registers are provided in an interface portion. If a command to write data is supplied from the microcomputer to the signal processing portion in an effective video period for a video signal, data, which must be transferred, and address are temporarily stored in the registers and the stored signals are transferred to the signal processing portion in a retrace line period for a next video signal. As a result of the structure, data is written on the signal processing portion in the retrace line period for the next video signal even if the command to write data is supplied from the microcomputer to the signal processing portion. Therefore, if data different from the data which must be transferred is supplied from the microcomputer to the register on which the data for the signal processing portion has been written, the effective image plane is not affected.

22 Claims, 10 Drawing Sheets

VIDEO CAMERA AND METHOD WITH CONTROLLED INTERFACE REGISTERS

BACKGROUND OF THE INVENTION

1. Field of the Invention

The present invention relates to a video camera for digital-computing a video signal.

2. Description of the Related Art

An example of data communication between a logical computing portion (hereinafter called a "microcomputer") and a signal processing portion in a conventional video camera (hereinafter called a "digital camera") for digital-computing a video signal will now be described with reference to FIGS. 1 and 2A to 2C.

FIG. 1 is a block diagram showing the structure of a conventional digital camera, and FIGS. 2A to 2C are timing charts showing a state of communication between an ordinary microcomputer and an interface.

Referring to FIG. 1, reference numeral 1 represents a lens, 2 represents an image sensing device for converting, into an electric signal, an image of an object projected by the lens 1, 3 represents an A/D converter for converting a video signal supplied from the image sensing device 2 into a digital signal, 4 represents a signal processing portion for computing a digital signal converted from the analog signal, 5 represents an interface portion for reading or writing data onto a data register included in the signal processing portion 4, 6 represents a microcomputer that receives data read by the interface portion 5 to process data in a predetermined manner or transmit data to be written to the interface portion 5, and 7 represents a D/A converter for converting computed video signal into an analog signal.

In the signal processing portion 4, reference numerals 411 to 41n represent writing registers for writing data received by the interface portion 5 from the microcomputer 6. Data to be stored in the registers 411 to 41n is data (for example, the gains of AGC signals, those of R, G and B signals for white balance and a value for determining a region for autofocusing process) required for operations to process the video signal in the signal processing portion 4. Reference numerals 421 to 42n represent reading registers for storing data in the signal processing portion 4 to transmit it to the microcomputer 6. Reference numeral 43 represents a status register for holding, for each register, a state whether data has been stored in each of the reading registers 421 to 42n or not. Reference numeral 44 represents an OR circuit for obtaining an interruption signal from load signals L1 to Ln of each reading register. Reference numeral 45 represents a data selector. Each of the aforesaid registers is a shift register which is capable of serially inputting/outputting data when it receives a clock. Reference numeral 46 represents a timing generator for generating a load signal for each register at an adequate timing during the signal process.

An image of an object projected by the lens 1 is converted into an electric signal by the image sensing device 2 and converted into a digital signal by the A/D converter 3 before it is transmitted to the signal processing portion 4. The signal processing portion 4 receives data from the microcomputer 6 through the interface portion 5, the data being required to process the digital signal supplied from the A/D converter 3. The microcomputer 6 receives data required to compute data from the signal processing portion 4 through the interface portion 5.

FIGS. 2A to 2C are charts showing timing of serial communication between the microcomputer 6 and the interface portion 5. The communication is performed through a clock line CLK, a writing data line DW, a reading data line DR, and a MODE line for selecting a data reading mode or data writing mode or address assignment mode, the aforesaid lines being shown in FIG. 1.

(Assignment of Address)

When mode information for assigning the address is transmitted from the microcomputer 6 to the interface portion 5 through the MODE line as shown in FIG. 2A, the interface portion 5 transmits a clock signal to the microcomputer 6 through the line CLK. The microcomputer 6 transmits address signals (A0 to A7) through the line DW in synchronization with the supplied clock. The interface portion 5 receives the address signal to set the address in an address register (omitted from illustration) in the interface portion 5.

(Writing of Data)

If, for example, data writing mode information is transmitted from the microcomputer 6 through the line MODE as shown in FIG. 2B, the interface portion 5 transmits a clock signal to the microcomputer 6 through the line CLK similarly to the address assignment operation. The microcomputer 6 transmits writing data signals (D0 to D7) through the line DW in synchronization with the clock signal. The interface portion 5 receives the writing data. At this time, the interface portion 5 transmits a signal to any one of WCLK1 to WCLKn shown in FIG. 1 and corresponding to the register of the addresses in accordance with the address set previously and transfers writing data through a writing line WD in synchronization with the foregoing clock signal.

(Reading of Status Data)

If data has been, in the signal processing portion 4 shown in FIG. 1, loaded into any one of the reading registers 421 to 42n through load signals L1 to Ln in response to load signals generated by the timing generator 46 at predetermined timing, the load signals pass through the OR circuit 44 and serve as interrupting signals for the microcomputer 6. The load signals as well as raise the bit in the status register 43 corresponding to the reading register, the bit being held until the data loaded into the reading register is read. The load signals, which have passed through the OR circuit 44, interrupt the microcomputer 6 through line IRQ shown in FIG. 1. The microcomputer 6 starts communication for obtaining information denoting the reading register into which data has been loaded.

The communication is performed in such a way that the address of the status register 43 is set by transmitting status register address to the interface portion 5 through the line DW at the timing shown in FIG. 2A. Then, the microcomputer 6, as shown in FIG. 2C, transmits information about the data reading mode to the interface portion 5 through the line MODE. When the interface portion 5 receives the foregoing mode information, it sets the data selector 45 so as to obtain an output from the status register 43 in accordance with the address supplied previously. Furthermore, the interface portion 5 transmits RCLK1 to RCLKn shown in FIG. 1 and corresponding to the status register to the signal processing portion 4. The status register 43 transfers data to the interface portion 5 through line RD in synchronization with the clock. When the interface portion 5 has received the data, it transmits a clock signal to the microcomputer 6 through the line CLK at the timing shown in FIG. 2C. Furthermore, in synchronization with this, the interface portion 5 transmits data obtained from the status register 43 trough the line DR.

(Reading of Data of Reading Register)

When the microcomputer 6 receives data from the status register 43, it then discriminates the reading register in the signal processing portion 4 that has been brought to the loaded state. Then, the microcomputer 6 transmits the address of the loaded reading register to the interface portion 5 at the timing shown in FIG. 2A. The interface portion 5 sets the address therein. Then, the microcomputer 6 transmits data reading information to the interface portion 5 through the line MODE. The interface portion 5 sets the data selector 45 in accordance with the address set previously and transmits RCLK1 to RCLKn corresponding to the reading register in accordance with the address. The corresponding reading register transmits data in synchronization with the clock so as to be transferred to the interface portion 5 as RD. The interface portion 5 makes the data synchronize with the clock signal of the line CLK at the timing shown in FIG. 5 to transmit it to the microcomputer 6 through the line DR.

However, if data is transferred from the microcomputer 6 to the signal processing portion 4 in an effective period for the video signal, data which is different from the data that must be transferred is undesirably transmitted during data shifting in a case where the register in the signal processing portion 4, to which the data is transferred, is the shift register. If the register is a register which directly affects the waveform of the video signal, such as the white balance or AGC, noise appears in the image plane.

The conventional example requires the following four serial communications in the signal processing portion 4 from a moment the reading register is loaded to a moment the microcomputer 6 receives the data in the reading register:

(1) Assignment of the address of the status register 43,
(2) Transference of data in the status register 43,
(3) Assignment of the address of the reading register, and
(4) Transference of data in the reading register.

Therefore, if the clock of the microcomputer is slow, a long time takes and the speed, at which a video signal is processed, is lowered. That is, problems rise in that response of an auto focus for adjusting the state of focusing of an optical system of a camera deteriorates or response of an automatic iris for adjusting the quantity of incidental light upon the optical system deteriorates.

SUMMARY OF THE INVENTION

An object of the present invention is to provide a video camera and a method of controlling the same capable of eliminating noise generating due to internal register of a signal processing portion from an image plane thereof and of raising the speed, at which the video signal is processed, so that response of, for example, auto focus for adjusting a state of focusing of an optical system of a camera or automatic iris for adjusting the quantity of light incident on the optical system is improved.

In order to achieve the foregoing object, according to one aspect of the present invention, there is provided a video camera for digital-processing a video signal comprising: signal processing means for processing a digitized video signal in accordance with predetermined control data; storage means for storing the control data; and control means for writing at least the control data that affects the video signal into the storage means, within a retrace line period for the video signal.

According to another aspect of the present invention, there is provided a video camera that converts an image of an object projected by a photographing lens into an electric signal by an image sensing device thereof, A/D converts the video signal, processes the digital signal in a signal processing portion thereof, and D/A converts the signal so that a standardized video signal is obtained, the video camera comprising: a microcomputer for computing data for controlling the signal processing portion; a plurality of control registers disposed in an interface portion interposed between the microcomputer and the signal processing portion for performing communication of the control data between the signal processing portion and each of internal data registers in such a way that a digital signal of a plurality of bits is treated as data of one word; and transference control means that has an arrangement that, if the control data, which must be supplied from a logical computing portion to the signal processing portion, is transferred in an effective video period for a video signal, the transference control means temporarily makes the control register store the transferred control data together with the address of a receiver of the control data and transfers the transferred data to a register in the signal processing portion corresponding to the address in a retrace line period for a video signal which will come next.

The interface portion further comprises: a counter for counting the number of the control registers in which the control data is stored; and inhibition means for inhibiting communication until a retrace line period for a next video signal comes even if a command to write data is issued from the microcomputer in a case where transferred data and the address of the receiver are not transferred and accommodated in all control registers in accordance with the value of the counter.

According to another aspect of the present invention, there is provided a video camera in which a video signal is digital-computed comprising: a status register in which the state of bits corresponding to respective reading registers is changed if data has been written on a register to be read from outside when communication is performed between a microcomputer and an internal data register in such a way that a digital signal of a plurality of bits is treated as data of one word; and reading means for reading the status register from the microcomputer simultaneously with transference of the address or the data when the microcomputer sets the address of the register to be read from outside or when communication is performed to transfer data to a register onto which data is written from outside. The status register has information of timing of a synchronizing signal of the video camera.

The foregoing structure comprises a plurality of the control registers disposed in the interface portion so that, when a command to transfer data is issued from the microcomputer to the signal processing portion 4 in an effective video period for a video signal, the transferred data and the address of the receiving side are temporarily stored in the control register in the interface portion. In a retrace line period for a next video signal, the data is transferred to the signal processing portion. In a case where all control registers in the interface portion 5 store the data and address which are not transferred, the interface portion does not supply the clock for the communication until the retrace line period for the next video signal comes even if a command to write data is supplied from the microcomputer to the interface portion 5 to the signal processing portion. Thus, if data different from the data, which must be transferred, is transmitted as data for use in the signal process in the effective video period for a video signal during the data shift of the register, on which data is written, in the signal processing portion, it does not affect the effective image plane.

In a case where an address signal or a data signal is transferred from the microcomputer to the interface portion in the communication between the microcomputer and the interface portion, data of the status register made to be synchronized with the clock for the communication is transferred from the interface portion to the microcomputer. Therefore, the microcomputer receives the data from the reading register as a result of the following three serial communication processes.

(1) Transference of data of predetermined address or that of addresses,
(2) Assignment of the address of a reading register, and
(3) Transference of data in reading register.

If (2) and (3) are continued, the data of the status register obtained by communication (3) performed previously is used to assign the next address. Therefore, the data transference can be completed by two serial communication operations. As a result, the serial communication with the microcomputer can be completed in a shortest time.

As described with reference to the first embodiment, a plurality of the control registers are disposed in the interface portion so that, when a command to transfer data is issued from the microcomputer 6 to the signal processing portion 4 in an effective video period for a video signal, the transferred data and the address of the receiving side are temporarily stored in the control register. In a retrace line period for a next video signal, the data is transferred to the signal processing portion 4. Therefore, even if the transmission of data different from the present data from the microcomputer 6, which must be transferred to the register in the signal processing portion 4, during the data shift in the signal processing portion in the retrace line period happens that data does not affect the effective image plane.

In addition to the arrangement of the first embodiment, the second embodiment comprises a counter for counting the number of control registers stored in accordance with a command to write data supplied from the microcomputer 6 in one effective video period. If all control registers store data to be transferred and the address of the receiver side without transference in accordance with the result of counting performed by the counter, an inhibition command is supplied to the clock generator for generating a clock to the microcomputer 6 to inhibit the supply of the clock. If no command to write data is issued by the microcomputer after one effective video period has been ended, it is discriminated in accordance with the result of counting performed by the counter to inhibit data transference from the control register to the signal processing portion if the retrace line period has come. As a result, even if a command to write data is supplied from the microcomputer by a quantity exceeding the allowable limit for the control register in one effective video period, the microcomputer is brought to a waiting state until the next effective video period comes. Thus, data loss from the control register can be prevented. If all control registers are in an empty state, wasteful transference of data to the signal processing portion is prevented even if the retrace line period comes. Therefore, power consumption can be reduced.

In addition to the second embodiment, the third embodiment has the arrangement that the data assignment by the decoder 53 is performed in accordance with a direct data line output from the microcomputer 6 in a vertical retrace line period. Furthermore, the switch is disposed between the data output to the writing register of the signal processing portion 4 and the output from the control register to switch the data output to the writing register in the signal processing portion in response to a vertical retrace line period signal (hereinafter called "VBLK") between the control register and the data line from the microcomputer 6. As a result, data communication is performed in the vertical retrace line period without the control register so that even a microcomputer having a slow clock rate is able to transfer data of a required quantity in the vertical retrace line period.

As described above with reference to the fourth embodiment, when the address signal or data is transferred from the microcomputer 6 to the interface portion 5 through the line DW, data of the status is always transferred to the microcomputer through the line DR. Therefore, the number of the serial communication operations between the signal processing portion 4 and the microcomputer 6 can be decreased. Furthermore, the addition of information of HD and VD to the status information enables data to be transferred to the internal writing register in the signal processing portion 4 from the microcomputer at adequate timing.

Further objects, features and advantages of the present invention will become apparent from the following detailed description of embodiments of the present invention with reference to the accompanying drawings.

DESCRIPTION OF THE PREFERRED EMBODIMENTS

[First Embodiment]

An embodiment of the present invention will now be described with reference to FIGS. 3, 4 and 5 as compared with FIGS. 1 and 2A to 2C showing a conventional example. FIG. 3 is a block diagram showing the structure of this embodiment, and FIGS. 4 and 5 are charts showing the timing of serial communication performed among a microcomputer 6, an interface portion 5a and a signal processing portion 4.

Figure 1:
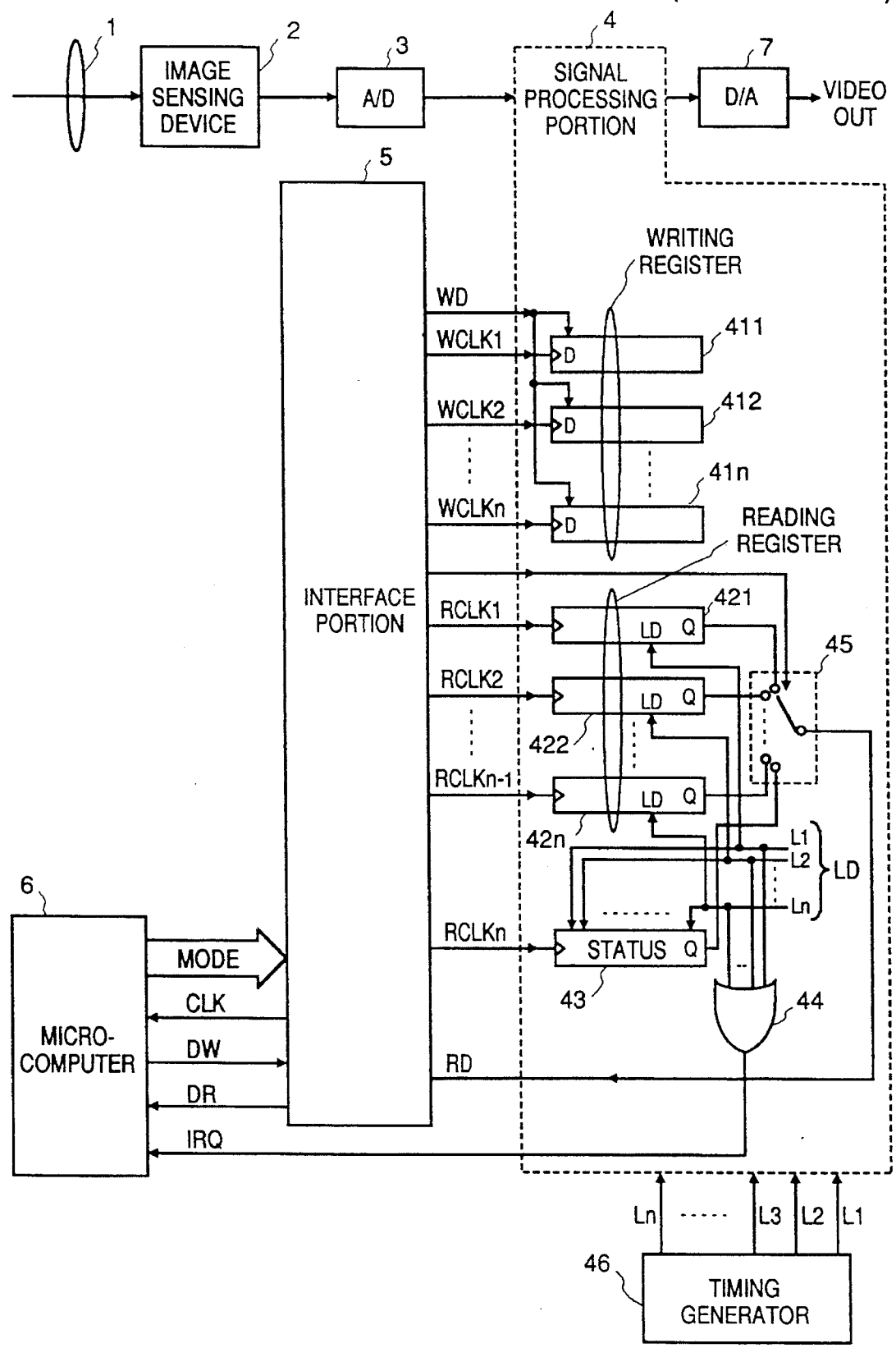
FIG. 1 is a block diagram showing the structure of a conventional example.

Referring to FIG. 3, elements 1 to 4 and 6 are the same as those of the conventional example shown in FIG. 1. In the interface 5a, reference numerals 511 to 514 represent control registers for storing addresses, 521 to 524 represent control registers for storing data, and 53 represents a decoder that sets the address of a register to which data must be transferred in accordance with an output from the control register 514 for storing the address to transmit a clock signal to the register.

Figure 2A:
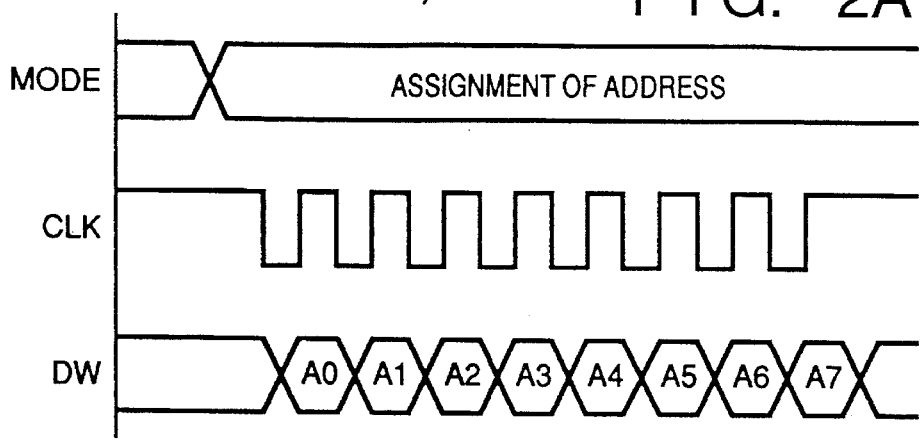
FIGS. 2A to 2C are timing charts of the general operation.
Figure 2B:
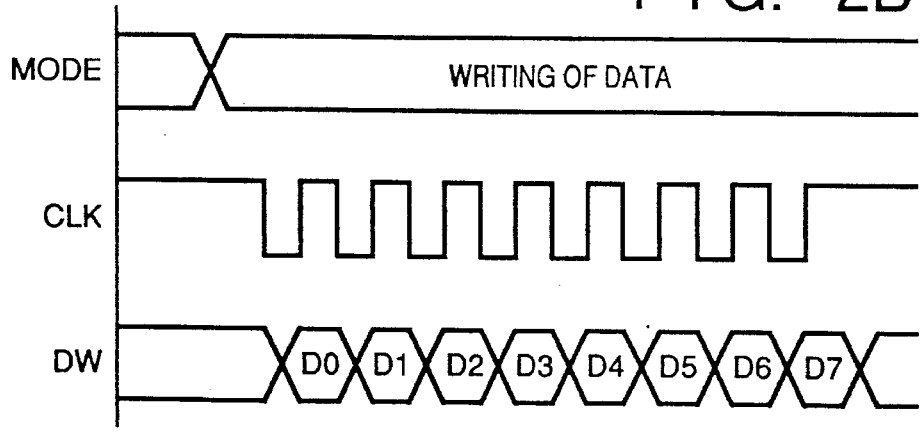
Figure 2C:
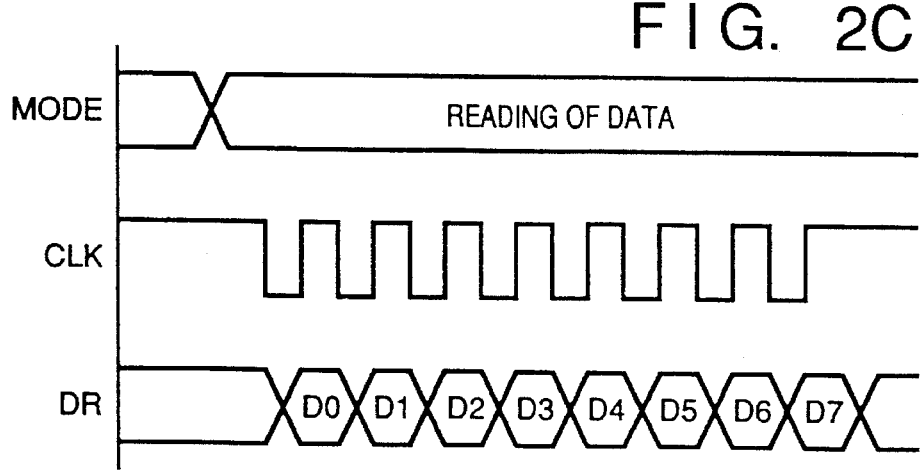
Figure 3:
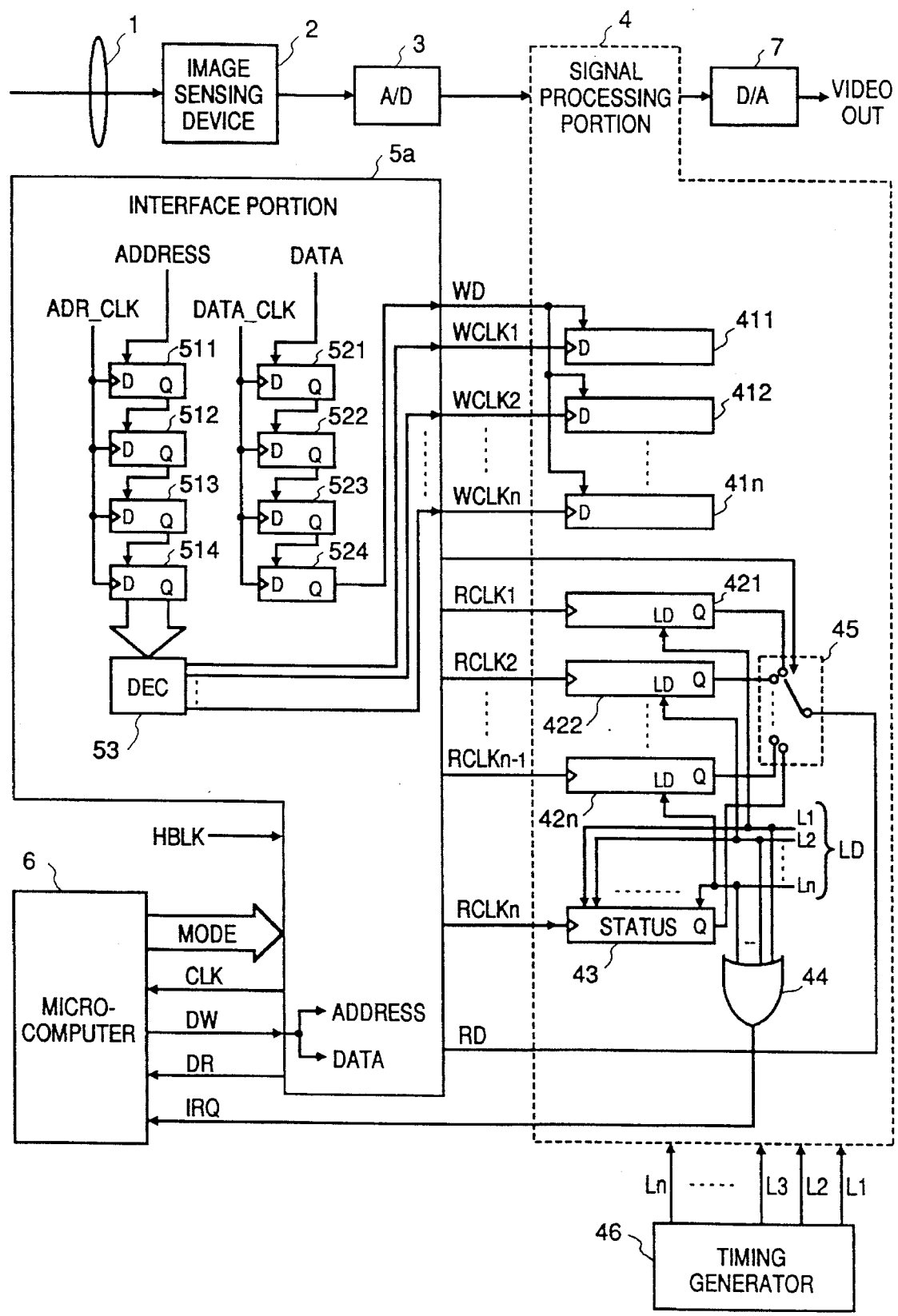
FIG. 3 is a block diagram showing the structure of a first embodiment of the present invention.

The microcomputer 6 supplies command to write data to the interface portion 5a through the line MODE, while the interface portion 5a transmits a clock signal to the microcomputer 6 through the link CLK at the same communication timing as that for the conventional example shown in FIG. 2B. The microcomputer 6 transfers data to the interface portion 5a in synchronization with the clock signal. FIG. 4 shows the timing of the communication similarly to the conventional example, the address of the register to which data is written is previously transferred to the interface portion 5a by performing the communication shown in FIG. 4 (1).

Figure 4:
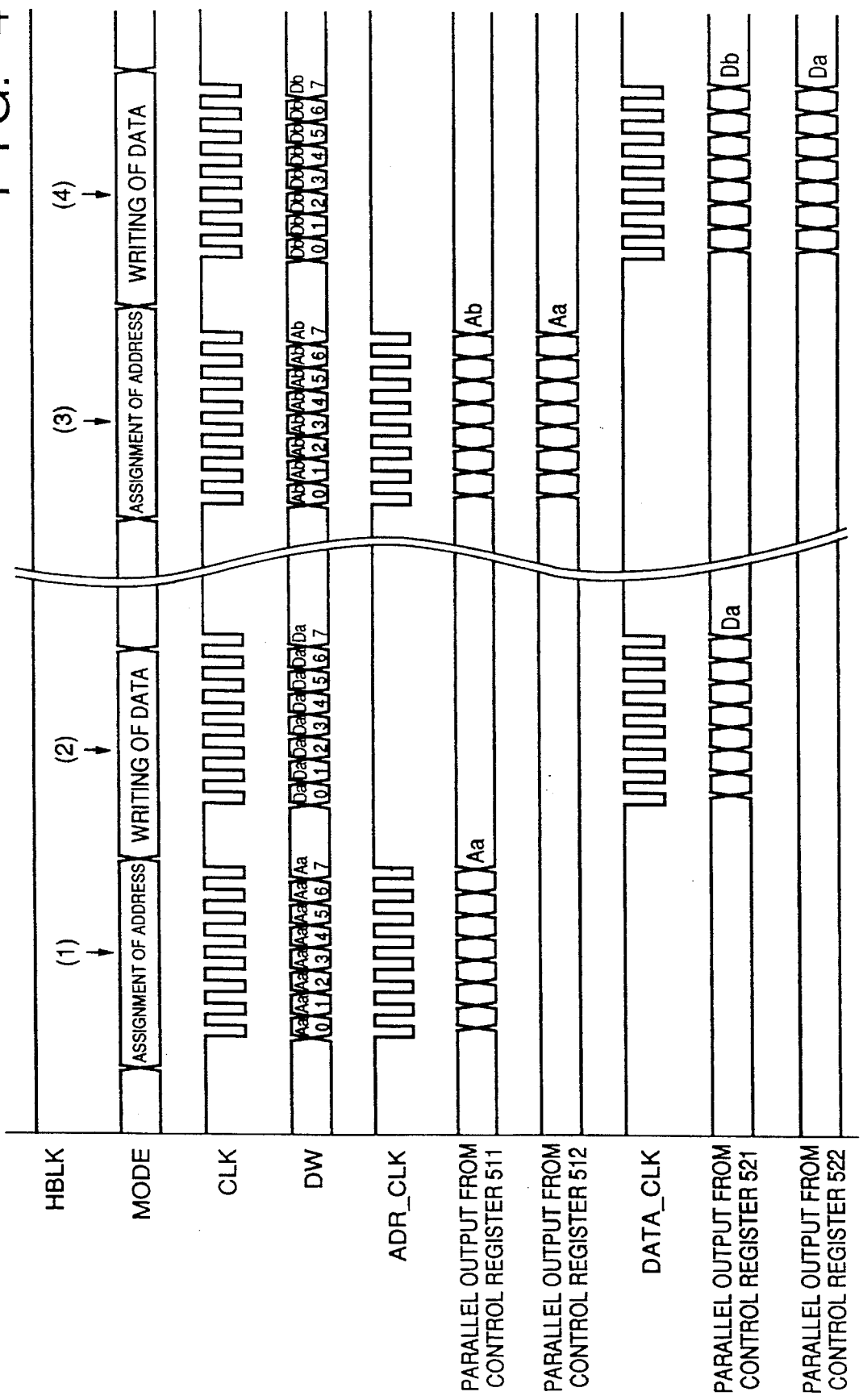
FIG. 4 is a timing chart of the first embodiment.
Figure 5:
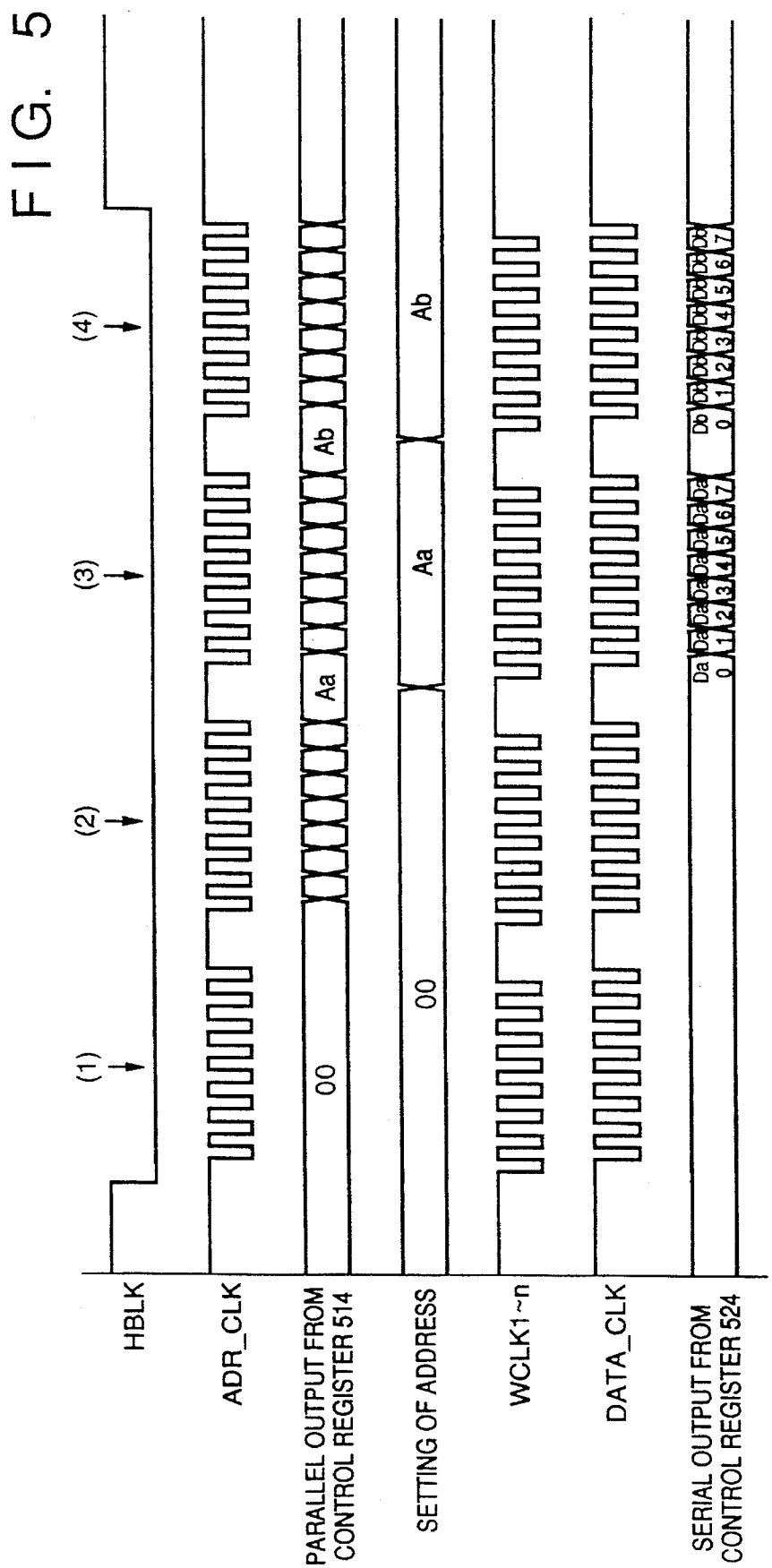
FIG. 5 is a timing chart of another embodiment of the present invention.

In the interface portion 5a, writing data Da0 to Da7 received from the microcomputer 6 in the foregoing process and addresses Aa0 to Aa7 of the registers, on which they are written, are temporarily transferred and stored into the control register 521 for storing data and the control register for storing the address shown in FIG. 3 in accordance with the procedures at the timing (1) and (2) shown in FIG. 4. Each control register in the interface portion 5a comprises a shift register having a serial input and a parallel output similarly to, for example, the writing register in the signal processing portion 4. If a command to write data is supplied from the microcomputer 6 in the foregoing state, the data Da0 to Da7 and addresses Aa0 to Aa7 are transferred to control registers 511 and 521 similarly to the process above. Simultaneously, data and addresses previously stored in the control registers 511 and 521 are transferred to be shifted to the next control registers 512 and 522. The foregoing data transference is performed in response to clocks ADR_CLK and DATA_CLK shown in FIG. 3 at the timing shown in FIG. 4.

The written data and address of the data-receipt registers supplied from the microcomputer 6 are stored in the control registers 521 to 524 and 511 to 514 but no data transference to the signal processing portion 4 is performed. In the interface portion 5a, if information of a retrace line period of a video signal has been obtained from input HBLK, the receiver register is determined in accordance with information of the addresses of the control registers 511 to 514 for storing the address. Further, a clock signal is supplied to only the determined register through any one of the clock lines WCLK1 to WCLKn. In synchronization with the clock signal, data in the control registers 521 to 524 for storing data is transferred to one of the receiver registers 411 to 41n through the line WD.

The foregoing process will now be described in detail with reference to FIG. 5.

The decoder 53 shown in FIG. 3 receives, in the foregoing process, address information from the parallel output from the control register 514 at the address setting timing shown in FIG. 5 so as to set the address. Furthermore, the decoder 53 selects any one of clock lines WCLK1 to WCLKn to generate clock for communication to only any one of the thus-set address writing registers 411 to 41n at the timing of WCLK1 to WCLKn shown in FIG. 5. Simultaneously, the decoder 53 supplies a clock to the control registers 521 to 524 at timing DATA_CLK shown in FIG. 5. In synchronization with the clock, the control register 524 transmits a serial output shown in FIG. 5. In response to the clock and in accordance with the data output, data Da0 to Da7 and Db0 to Db7 are received into writing registers having addresses Aa0 to Aa7 and Ab0 to Ab7 corresponding to the data.

In this case, the data and addresses supplied from the microcomputer 6 during the effective video period are two words respectively, thus resulting in that the addresses are stored in the control registers 511 and 512 among the control registers 511 to 514 and that data is stored in control registers 521 and 522 among the same at the start of the retrace line period. In this state, the residual control registers 513, 514, 523 and 524 are in an empty state. Therefore, data and address are transmitted as "0" at the transference timings (1) and (2) shown in FIG. 5 for the initial two words and accordingly no data is written on writing registers 411 to 41n.

It should be noted that data is read from the reading registers and the status registers in a manner similar to the conventional technology.

[Second Embodiment]

If a multiplicity of commands to write data have been issued from the microcomputer 6 in one effective video period, the first embodiment encounters a fact that the quantity of data exceeds a quantity permissible for the control register in the interface portion 5a. In this case, the sequential transference of data and address starting to the data and address stored initially cannot be performed and data shift takes place, thus resulting in that the contents are lost.

On the contrary, if no command to write data is issued from the microcomputer 6 in the effective video period, empty data transference is undesirably performed in the next retrace line period. In this case, electric power will be consumed to perform the foregoing undesirable operation.

This embodiment has a counter for counting the number of control registers stored in accordance with commands to write data issued from the microcomputer 6 in one effective video period. If a discrimination has been made in accordance with the results of counting performed by the counter that all control registers store data and the receiver's addresses without transference, an inhibition command is issued to a clock generator, which generates clocks to be supplied to the microcomputer 6, so as to inhibit the supply of the clock. Furthermore, if no command to write data has been issued from the microcomputer 6 after one effective video period has elapsed, it is discriminated in accordance with the results of counting performed by the counter. Thus, transference of data from the control register to the signal processing portion 4 is inhibited even if the retrace line period has started. As a result, the microcomputer 6 is brought to a waiting state until the next effective video period has come even if commands to write data, the quantity of which exceeds the allowable quantity for the control register, have been issued from the microcomputer 6 in one effective video period. Thus, the loss of data in the control register is prevented. If all control registers are in an empty state, wasteful transference of data to the signal processing portion 4 is prevented even in the retrace line period. Therefore, the electric power consumption can be reduced.

A specific description will be made with reference to FIG. 6.

Figure 6:
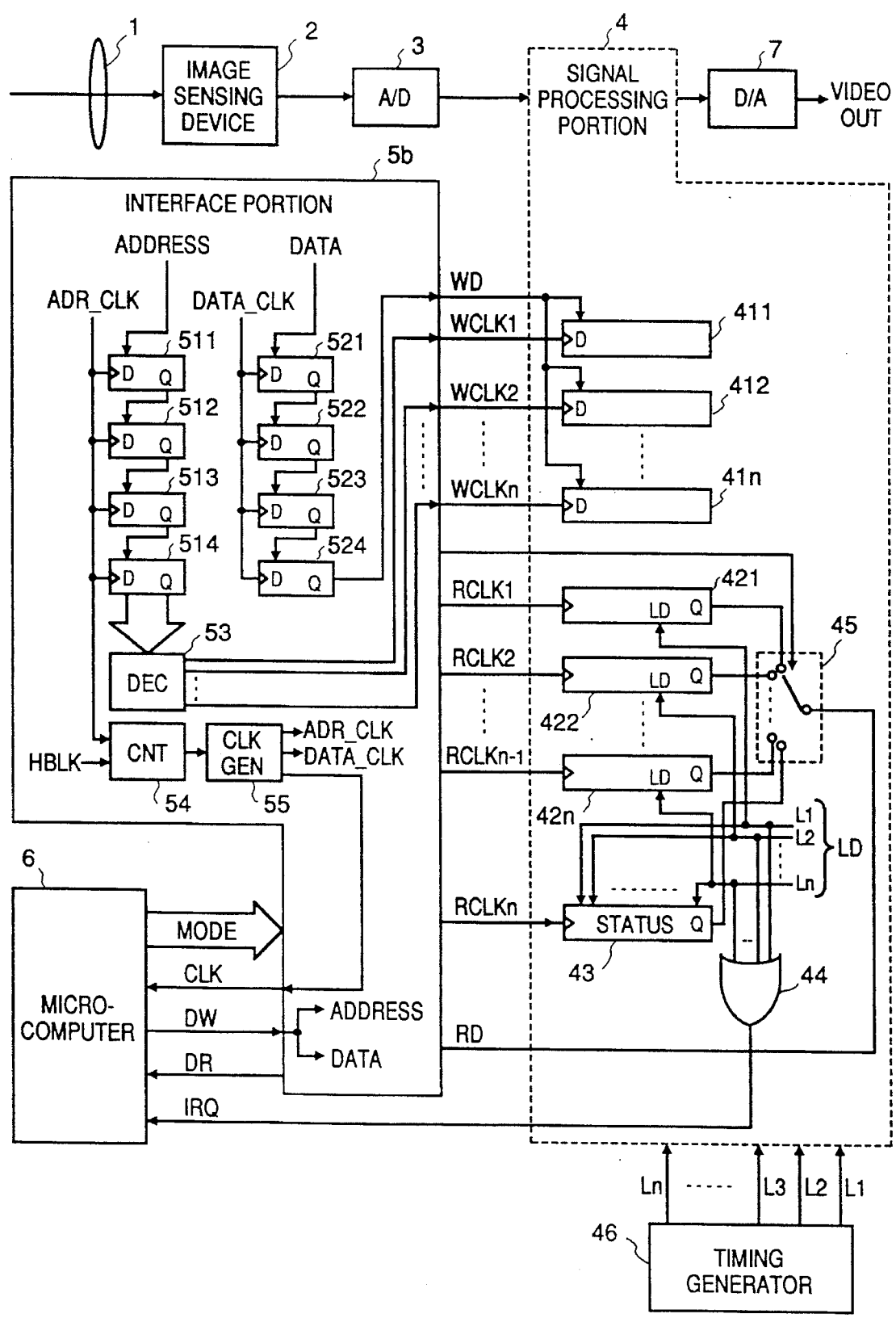
FIG. 6 is a block diagram showing the structure of a second embodiment of the present invention.

FIG. 6 is a block diagram, in which elements having the same symbols or reference numerals as those shown in FIGS. 1 and 3 are elements having similar functions. Referring to FIG. 6, reference numeral 54 represents a counter for counting the number of words stored in the control registers 511 to 514 for storing the addresses and the control registers 521 and 524 for storing data. Reference numeral 55 represents a clock generator for generating a clock signal.

When a command to assign the address and that to write data have been supplied from the microcomputer 6 to the interface portion 5b, the address and data are transferred to the control registers 511 and 521. The counter 54, at this time, counts the address clock signals ADR_CLK so that the number of words for the addresses and data transferred in one effective video period is counted.

In this embodiment, the control register has four words for storing data and addresses, respectively. If the microcomputer 6 has supplied five or more commands to write data to the interface portion 5b, the counter 54 counts the number of the time of the transference operations between the microcomputer 6 and the control register in one effective video period by counting the ADR_CLK signals. If the result of counting exceeds four, the inhibition command is supplied to the clock generator shown in FIG. 6. In accordance with the inhibition command, the clock generator 55 does not generate the clock for the communication even if the microcomputer 6 has supplied a command to write data or assign the address to the interface portion 5b. In this case, the microcomputer 6 is brought to a waiting state until the data and addresses in the control registers 511 to 514 and 521 to 524 are transferred to the signal processing portion 4.

If no command to write data has been issued from the microcomputer 6 in one effective video period, this fact is discriminated from the result of counting performed by the counter 54 and commands to inhibit clocks ADR_CLK and DATA_CLK are issued so that no clock signal for the control register is generated by the clock generator 55 even if the retrace line period has started. In this case, no data is transferred from the control registers 511 to 514 and 521 to 524 to the signal processing portion 4.

In a slave mode in which the clock is generated by a section for receiving data from a microcomputer, the inhibition of the supply of the clock generally makes the microcomputer 6 stop all computing operations and brings the microcomputer 6 to a waiting state until the clock is supplied. In this embodiment, the waiting state is continued until the retrace line period starts. If an intention is made to cause the microcomputer 6 to perform calculations during the waiting state, it might be feasible to employ an input/output port disposed between the microcomputer 6 and the interface portion 5b to supply information denoting whether or not the control register has a blank portion so as to make the microcomputer 6 not to issue a command to write data if a discrimination has been made in accordance with the information that no blank portion is present in the control register. In this case, the microcomputer 6 is able to perform another computing operation even in the waiting state. The foregoing structure enables data to be read from the reading register and status register even if the control register is filled with data during the effective video period.

[Third Embodiment]

The foregoing embodiment having the arrangement that data and address are temporarily accommodated in the control register of the interface portion 5a or 5b when a command to write data has been supplied from the microcomputer 6 and then data is transferred from the control register to the signal processing portion 4 involves a necessity of performing communications two times in order to perform one time of data transference. Therefore, a microcomputer of a type having a slow clock rate sometimes encounters a problem that data transference cannot be completed by the number required in a vertical blanking period.

This embodiment has an arrangement that the assignment of the address to be performed by the decoder 23 is performed in accordance with an output from a microcomputer through a data line during a vertical retrace line period. Furthermore, a switch is disposed between the data output to be supplied to the writing register in the signal processing portion 4 and the output from the control register. Thus, the data output to be supplied to the writing register in the signal processing portion 4 is switched between the data line from the control register and that from the microcomputer 6 in response to a vertical retrace line period signal (hereinafter abbreviated to "VBLK"). As a result, data communication is performed during the vertical retrace line period without the control register, thus enabling data in a required quantity to be transferred in the vertical retrace line period even if the microcomputer has a low clock rate.

This embodiment will now be described specifically with reference to FIGS. 7 and 8.

Figure 7:
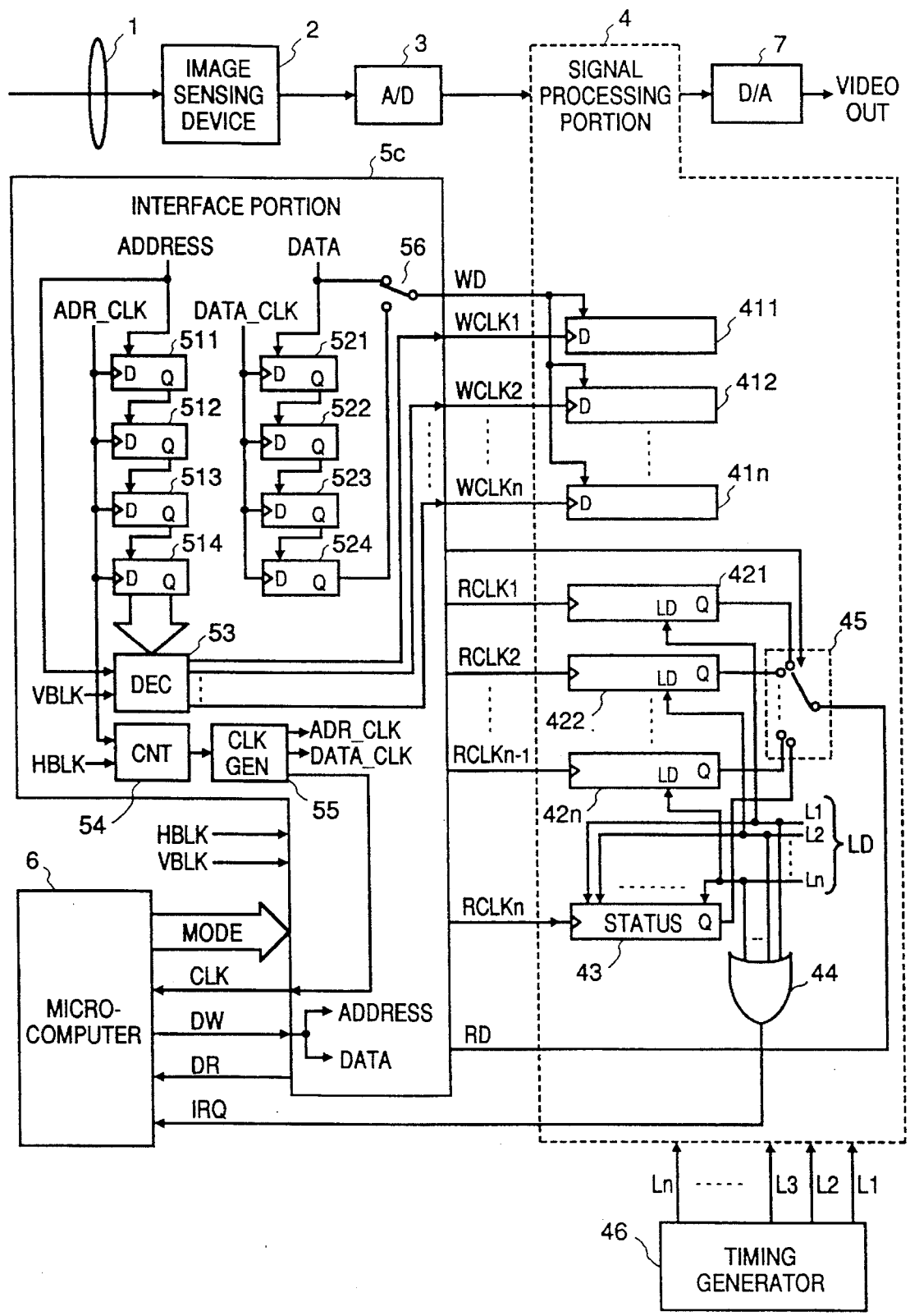
FIG. 7 is a block diagram showing the structure of a third embodiment of the present invention.

FIG. 7 is a block diagram showing the structure of this embodiment. FIG. 8 is a chart showing timing of communications performed between the microcomputer 6 and the interface portion 5c and between the interface portion 5c and the signal processing portion 4.

Referring to FIG. 7, elements 1 to 4, and 6 and 7, elements in the signal processing portion 4, elements 511 to 514, 521 to 524 and 53 to 55 in the interface portion 5 are similar elements to those shown in FIG. 6. Reference numeral 56 represents a switch for changing over the data line connected to the writing registers in the signal processing portion 4 between the data line from the microcomputer 6 and that from the control register.

A decoder 53 in the interface portion 5c shown in FIG. 7 assigns the address while giving priority to the parallel output from the control register 514 similarly to the foregoing embodiment if the VBLK signal is in a video period except the vertical retrace line period for the video signal. At this time, the switch has selected the serial output from the control register 524. If a command to write data is, in the aforesaid state, issued from the microcomputer 6 in a video period except the vertical retrace line period, the process is performed through the control registers 511 to 514 and 521 to 524 similarly to the foregoing embodiment.

In the vertical retrace line period, the decoder 53 detects the period in response to the VBLK signal and assigns the address while giving priority to the serial input directly supplied from the microcomputer 6. FIG. 8 shows the foregoing process. If a command to assign the address is supplied from the microcomputer 6 to the interface portion 5c through the line MODE as shown in FIG. 8 (1), the clock generator 55 generates clock CLK. The microcomputer 6 supplies the address signals Aa0 to Aa7 to the interface portion 5c through the line DW in synchronization with the clock CLK. The decoder 53 in the interface portion 5c sets the address at the timing shown in FIG. 8. If the microcomputer 6 supplies a command to write data to the interface portion 5c as shown in FIG. 8 (2) after the address Aa has been set, the clock generator 55 similarly supplies the clock signal to the microcomputer 6 through the line CLK. In synchronization with this, the microcomputer 6 supplies data signals Da0 to Da7 shown in FIG. 8 to the interface portion 5c through the line DW.

In the vertical retrace line period, the switch 56 is selected to connect the line DW and thus a data signal supplied from the microcomputer 6 is directly supplied to each serial input of the writing registers 411 to 41n in the signal processing portion 4 through the line WD. The decoder 53, in accordance with the address Aa set previously, supplies the clock shown in FIG. 8 to only the writing register in the signal processing portion 4 that has the foregoing address through the clock lines CLK1 to CLKn. Thus, data Da (data Da0 to Da7) is written on the selected writing register in the signal processing portion 4 at the timing shown in FIG. 8.

Figure 8:
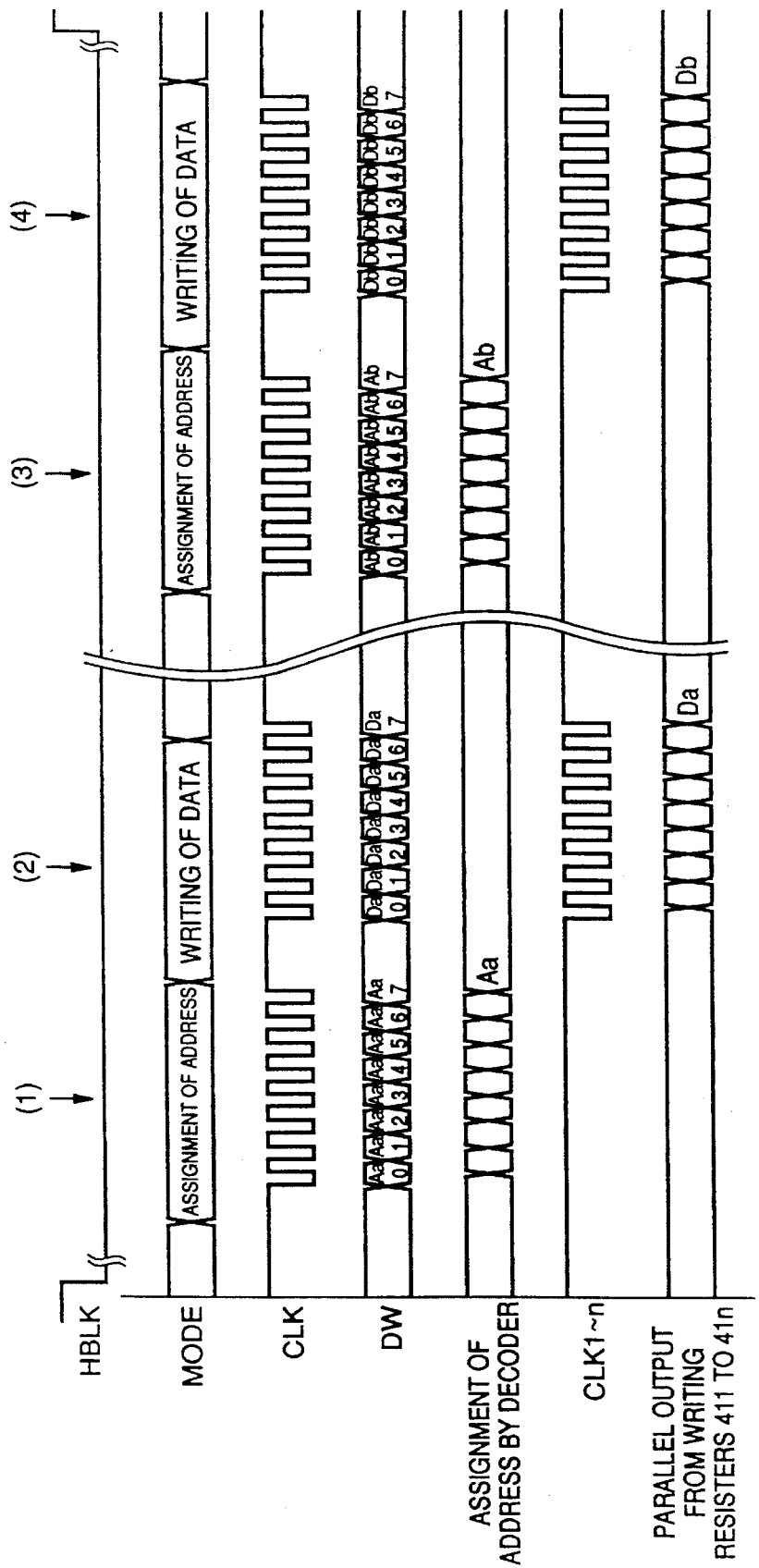
FIG. 8 is a timing chart of the third embodiment of the present invention.

In a case where the address signals Aa0 to Aa7 to assign the address shown in FIG. 8 and data writing commands Db0 to Db7 are supplied afterwards, the addresses Ab (Ab0 to Ab7) are set similarly to the foregoing process if the vertical retrace line period has started. Thus, data Db (Db0 to Db7) are written on the writing registers having the corresponding addresses.

The period in which direct transference of data from the microcomputer 6 to the signal processing portion 4 is not limited to the vertical retrace line period. For example, the assignment of a region for obtaining information of a video signal for performing auto focusing operation may be carried out in such a way that data is directly transferred to the writing register for assigning the region in a processing period except the region in which the region is assigned in a video image plane. Data of the foregoing type is transferred without an influence of transference noise upon the image plane even in an effective video period.

Therefore, it might be considered feasible to employ a structure in which the decoder makes a discrimination in accordance with the set address to transfer the data directly from the microcomputer to the signal processing portion even if the period is not the vertical retrace line period.

[Fourth Embodiment]

Figure 9:
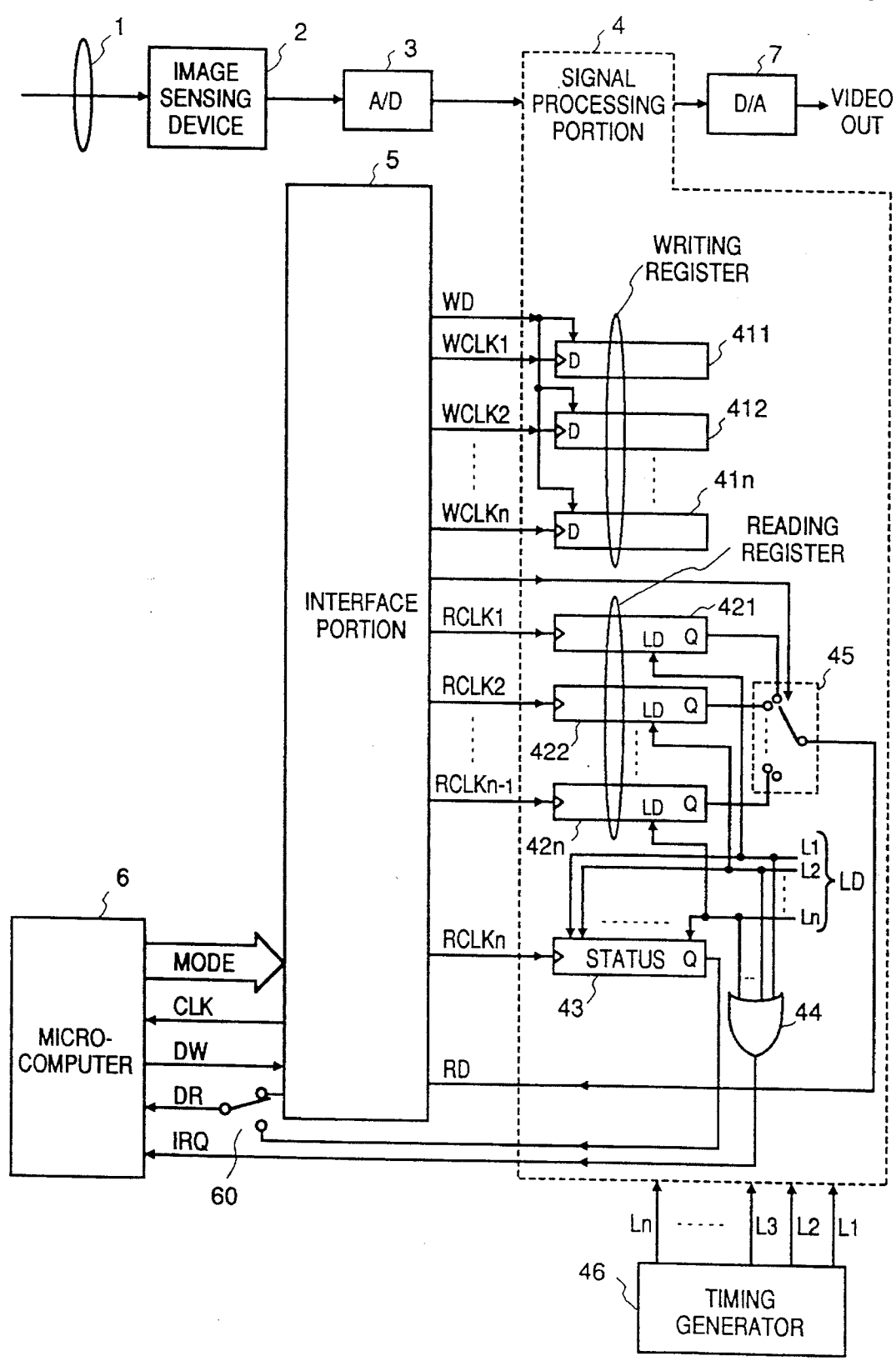
FIG. 9 is a block diagram showing the structure of a fourth embodiment of the present invention.
Figure 10A:
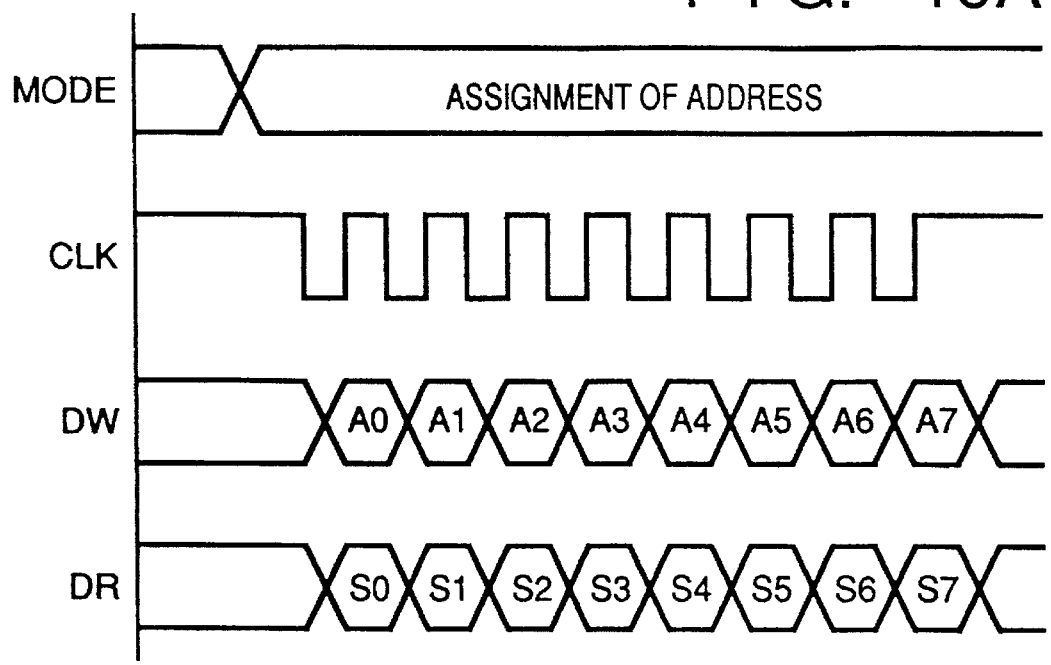
FIGS. 10A and 10B are timing charts of the fourth embodiment.
Figure 10B:
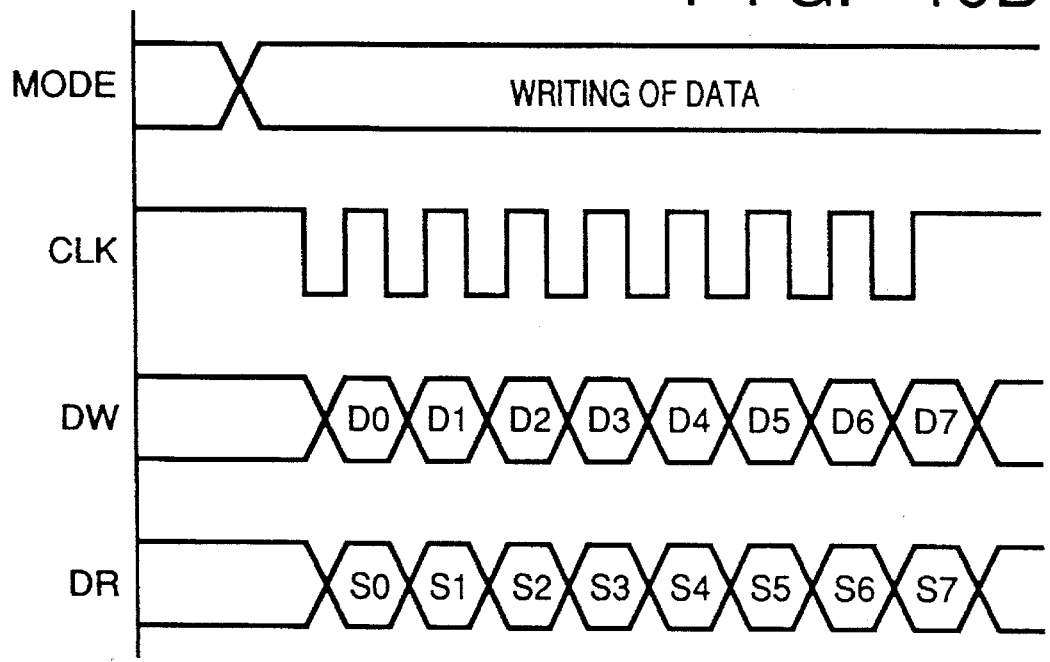

A fourth embodiment will now be described with reference to FIGS. 9, 10A and 10B. Referring to FIG. 9, elements in 1 to 7 and those in 4 are the same as those of the conventional example shown in FIG. 1. Reference numeral 60 represents a switch for switching the data line. FIGS. 10A and 10B are charts showing timings of a serial communication between the microcomputer 6 and the interface portion 5.

If any one of reading registers 421 to 42n is loaded in the signal processing portion 4 shown in FIG. 9, a bit of a status register corresponding to a loaded register is turned on and is held until the register is transferred. A load signal interrupts the microcomputer 6 through the OR circuit 44, and thus the microcomputer 6 transfers adequate data due to the interruption. Therefore, if data must be written on the set address prior to the interruption, the data is transferred. If no writing is required, communication for assigning an adequate address is performed.

The interface portion 5 changes over the data-line switch 60 to the output of the status register. In synchronization with the timing at which data or the address is transferred from the microcomputer 6 to the interface portion 5, the interface portion 5 supplies a clock (RCLKn) to the status register 43. The status register 43, as shown in FIGS. 10A and 10B, transfers data thereof to the microcomputer 6 through the line DR in synchronization with the clock. As a result of the aforesaid process, the communication for the microcomputer 6 to receive data in the status register 43, which is the information of the address of the loaded reading register, can be completed by only one serial communication operation shown in FIGS. 10A or 10B in the signal processing portion 4.

The microcomputer 6 is able to receive the data in the status register 43 and then receive data in the loaded reading register by performing two serial communication operations consisting of the address assignment communication and the data reading communication with the interface portion 5 similarly to the conventional example. If another reading register has been loaded prior to performing the address assigning communication and thus the microcomputer 6 has been interrupted, data in the status register 43 is transferred simultaneously with performing the address assigning communication. Therefore, the microcomputer 6 is able to obtain information of the address of the reading register to be read next.

In a case where loading of reading registers in the signal processing portion 4 is continued, the microcomputer 6 is able to obtain information of the addresses of the reading register to be read next in accordance with information from the status register simultaneously with performing the assignment of the address of the reading register with respect to the interface portion 5. Therefore, data in one reading register can be completed by only two communication operations consisting of the address assigning communication and the data reading communication.

Data to be accommodated in the status register 43 is not limited to information of the address of the reading register. For example, a horizontal synchronizing signal and a vertical synchronizing signal (hereinafter abbreviated to "HD and VD", respectively) made to be synchronized with a video signal of a video camera have important rolls in the signal processing process. It is sometimes convenient that the communication with the microcomputer 6 is performed in consideration with the timing with the synchronizing signals. In a case where data for adjusting the gain of a signal or color balance or the like is transferred from the microcomputer 6 to the signal processing portion 4 for example, transference of the data performed in an effective video period for a video signal sometimes makes data which is different from the data, which must be transmitted, transmit during shifting of data of a writing register. A portion of registers encounters appearance of noise in the video image plane.

Therefore, some registers are suitable to transfer data in the image blanking region. The register of the foregoing type is discriminated by the microcomputer 6 so that data is transferred in a blanking region in consideration of the timings of the HD signal and VD signal. Accordingly, it might be considered to provide exclusive bits in the status register 43 to obtain information of the signals HD and VD from status information read during the assignment of the register or the transference of data.

The fourth embodiment and any one of the first to third embodiments may be combined with each other. As a result, a video camera can be provided which is capable of writing data onto a writing register without an influence, such as noise, on an effective image and quickly reading data from the reading register. A structure of a type having no counter according to the third embodiment may be employed.

The present invention is not limited to the above embodiments and various changes and modifications can be made within the spirit and scope of the present invention. Therefore, to apprise the public of the scope of the present invention the following claims are made.

What is claimed is:

1. A video camera that converts an image of an object projected by a photographing lens into an electric signal by an image sensing device thereof, A/D converts the electric signal into a digital signal, processes the digital signal in a signal processing portion thereof to produce a processed digital signal, and D/A converts the processed digital signal so that a standardized video signal is obtained, said video camera comprising:

a microcomputer for computing data for controlling said signal processing portion;

a plurality of control registers disposed in an interface portion interposed between said microcomputer and said signal processing portion for performing communication of control data between said signal processing portion and each of internal data registers in such a way that a digital signal of a plurality of bits is treated as data of one word; and transference control means that has an arrangement that, if said control data, which must be supplied from a logical computing portion to said signal processing portion, is transferred in an effective video period for a video signal, said transference control means temporarily makes a control register store said control data together with an address of a receiver of said control data and transfers said control data to a register in said signal processing portion corresponding to said address in a retrace line period for the video signal which will come next.

2. The video camera according to claim 1, wherein said interface portion further comprises:

a counter for counting the number of said control registers in which said control data is stored; and inhibition means for inhibiting communication until the retrace line period for the next video signal comes even if a command to write the control data is issued from said microcomputer in a case where the transferred data and the address of the receiver are not transferred and accommodated in all control registers in accordance with the value of said counter.

3. The video camera according to claim 1, further comprising selection means for selecting transmission of said address and said control data to said interface portion through an output of said control register or direct transmission of the same to said interface portion from said microcomputer.

4. The video camera according to claim 3, wherein said selection means selects the direct transmission of said address and said control data from said microcomputer in at least a vertical retrace line period.

5. The video camera according to claim 3, wherein said selection means selects the direct transmission of said address and said control data from said microcomputer in a processing period except a period for a predetermined region.

6. The video camera according to claim 2, further comprising selection means for selecting transmission of said address and said control data to said interface portion through an output of said control register or direct transmission of the same to said interface portion from said microcomputer.

7. The video camera according to claim 6, wherein said selection means selects the direct transmission of said address and said control data from said microcomputer in at least a vertical retrace line period.

8. The video camera according to claim 6, wherein said selection means selects the direct transmission of said address and said control data from said microcomputer in a processing period except a period for a predetermined region.

9. The video camera according to claim 1, further comprising:

a status register in which the state of bits corresponding to respective reading registers is changed if the control data has been written on the register to be read from outside when communication is performed between the microcomputer and an internal data register in such a way that said digital signal of the plurality of bits is treated as the data of one word; and reading means for reading said status register from said microcomputer simultaneously with transference of said address or said control data when said microcomputer sets the address of said register to be read from the outside or when communication is performed to transfer the control data to the register onto which the control data is written from the outside.

10. The video camera according to claim 2, further comprising:

a status register in which the state of bits corresponding to respective reading registers is changed if the control data has been written on the register to be read from outside when communication is performed between the microcomputer and an internal data register in such a way that said digital signal of the plurality of bits is treated as the data of one word; and reading means for reading said status register from said microcomputer simultaneously with transference of said address or said control data when said microcomputer sets the address of said register to be read from the outside or when communication is performed to transfer the control data to the register onto which the control data is written from the outside.

11. The video camera according to claim 3, further comprising:

a status register in which the state of bits corresponding to respective reading registers is changed if the control data has been written on the register to be read from outside when communication is performed between the microcomputer and an internal data register in such a way that said digital signal of the plurality of bits is treated as the data of one word; and reading means for reading said status register from said microcomputer simultaneously with transference of said address or said control data when said microcomputer sets the address of said register to be read from the outside or when communication is performed to transfer the control data to the register onto which the control data is written from the outside.

12. The video camera according to claim 6, further comprising:

a status register in which the state of bits corresponding to respective reading registers is changed if the control data has been written on the register to be read from outside when communication is performed between the microcomputer and an internal data register in such a way that said digital signal of the plurality of bits is treated as the data of one word; and reading means for reading said status register from said microcomputer simultaneously with transference of said address or said control data when said microcomputer sets the address of said register to be read from the outside or when communication is performed to transfer the control data to the register onto which the control data is written from the outside.

13. A video camera for digital-processing a video signal comprising:

signal processing means for processing a digitized video signal in accordance with predetermined control data;

storage means for storing said control data;

control means for writing at least said control data that affects the video signal into said storage means, within a period for processing an undesired video signal; and reading means for reading change in status data of said signal processing means in synchronization with writing of said control data.

14. A method of controlling a video camera for digital-processing a video signal, comprising the steps of:

detecting a retrace line period for the video signal;

changing at least a portion of control data that affects the video signal in said retrace line period, and wherein, in said changing step, a horizontal retrace line period and a vertical retrace line period are distinguished from each other and change is performed in different procedure in accordance with a result of identification.

15. The method according to claim 14, further comprising the steps of:

detecting change in status data showing a state in which the video signal is processed;

reading changed status data; and computing the control data in accordance with said read status data, wherein said step of detecting change in status data is performed in synchronization with reading of said status data.

16. A method of controlling a video camera for digital-processing a video signal comprising:

detecting a period for processing an undesired video signal;

changing control data affecting at least the video signal in said processing period;

detecting change in status data showing a state in which the video signal is processed;

reading changed status data; and computing the control data in accordance with said read status data, wherein said detecting the change in status data is performed in synchronization with reading of said status data.

17. A video camera for digital-processing a video signal comprising:

signal processing means for processing a digitized video signal in accordance with predetermined control data;

storage means for storing said control data;

control means for writing at least said control data that affects the video signal into said storage means, within a period for processing an undesired video signal; and reading means for reading change in status data of said signal processing means in synchronization with reading of said status data.

18. A video camera for digital-processing a video signal comprising:

signal processing means for processing a digitized video signal in accordance with predetermined control data;

storage means for storing said control data;

control means for writing at least said control data that affects the video signal into said storage means, within a period for processing an undesired video signal; and reading means for reading change in status data of said signal processing means in synchronization with writing of said control data and reading of said status data.

19. The method according to claim 14, further comprising the steps of:

detecting change in status data showing a state in which the video signal is processed;

reading changed status data; and computing the control data in accordance with said read status data, wherein said step of detecting change in status data is performed in synchronization with changing of said control data.

20. The method according to claim 14, further comprising the steps of:

detecting change in status data showing a state in which the video signal is processed;

reading changed status data; and computing the control data in accordance with said read status data, wherein said step of detecting change in status data is performed in synchronization with reading of said status data and changing of said control data.

21. A method of controlling a video camera for digital-processing a video signal comprising:

detecting a period for processing an undesired video signal;

changing control data affecting at least the video signal in said processing period;

detecting change in status data showing a state in which the video signal is processed;

reading changed status data; and computing the control data in accordance with said read status data, wherein said detecting the change in status data is performed in synchronization with changing of said control data.

22. A method of controlling a video camera for digital-processing a video signal comprising:

detecting a period for processing an undesired video signal;

changing control data affecting at least the video signal in said processing period;

detecting change in status data showing a state in which the video signal is processed;

reading changed status data; and computing the control data in accordance with said read status data, wherein said detecting the change in status data is performed in synchronization with reading of said status data and changing said control data.

* * * * *

UNITED STATES PATENT AND TRADEMARK OFFICE
CERTIFICATE OF CORRECTION

PATENT NO. :   5,568,191

DATED      :   October 22, 1996

INVENTOR(S):   Kunihiko Yamada

It is certified that error appears in the above-identified patent and that said Letters Patent is hereby corrected as shown below:

On the cover page, Item [75], change "Tanishi" to -- Tanashi --.

Signed and Sealed this

Twenty-second Day of April, 1997

Attest:

BRUCE LEHMAN

*Commissioner of Patents and Trademarks*

*Attesting Officer*